Jan. 16, 1934.    B. M. DYCKMA    1,943,658
MANUFACTURE OF BEADED FABRIC
Filed Nov. 3, 1932

Inventor.
Bertha M. Dyckma

Attorney.

Patented Jan. 16, 1934

1,943,658

UNITED STATES PATENT OFFICE 1,943,658

MANUFACTURE OF BEADED FABRIC

Bertha M. Dyckma, Chicago, Ill.

Application November 3, 1932. Serial No. 641,007

2 Claims. (Cl. 41—36)

The invention relates to improvements in the manufacture of beaded fabric and particularly to an improved method of securing beads, jewels, or similar articles to fabric.

An object of the invention is to provide an improved non-vitreous plastic adhesive for permanently attaching beads to fabric.

Another object is to provide a beaded fabric which is capable of bending or movement in all directions without injury thereto.

Another object is to provide improved means of ornamenting fabric with beads or the like which are secured thereto permanently in an inexpensive manner.

The foregoing and such other objects of the invention as will appear hereinafter as the description proceeds, will be more readily understood from a perusal of the following specification, reference being had to the accompanying drawing, in which.

The new product is particularly adapted to be used in ornamenting curtains, costumes, or the like, employed in the theater, such articles being subjected to much handling and abuse which, when ordinary attaching means is used, causes the ornaments to fall off. The most practical known method used at present for attaching the ornaments to the fabric is by sewing, each ornament being pierced and separately sewed. It is apparent such means of attaching involves much labor and the necessity of replacing those ornaments fallen off is expensive.

Paste, glues, and other similar adhesives have been used to secure clusters of ornamental beads and the like to fabric but because of the nature of the paste, glue, or other adhesive, the attachment is not permanent, the adhesive becoming vitreous upon setting or failing to sufficiently adhere to the bead, which preferably is of glass.

The objections outlined in the foregoing, are overcome with the improved method of attaching, the improved non-vitreous plastic adhesive adhering to the beads and fabric, and having sufficient body, before setting, to form a retaining flange around each bead.

Figure 1:
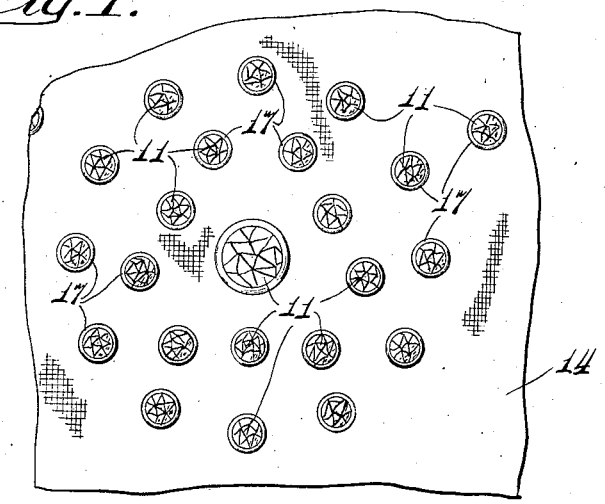
Fig. 1 is a fragmentary plan view of fabric having beads attached thereto in the improved manner.
Figure 2:
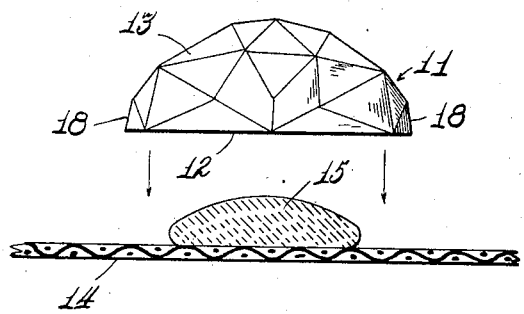
Fig. 2 is a vertical sectional view through the fabric plastic adhesive, and bead prior to attachment.
Figure 3:
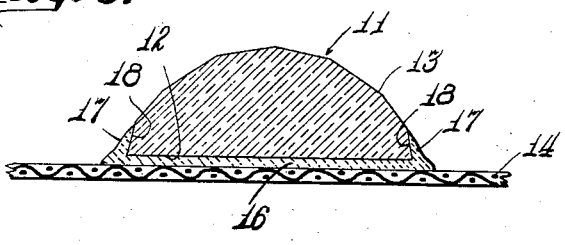
Fig. 3 is a view similar to Fig. 2 showing the bead secured in place.

As shown in the drawing the bead 11 used preferably is of glass, having a substantially flat face 12 on one side and which may be flat or substantially spherically shaped on the other side 13. The fabric 14 providing a flexible foundation sheet for the beads is provided with pliable globules 15 (Fig. 2) of the improved plastic adhesive, arranged in any desired relation to effect the configurations or designs desired. While the plastic adhesive is still pliable one of the beads 11 is set on each globule, flat side down, and pressure is applied thereto causing the plastic adhesive to spread beyond the margins of the bead, leaving a thin layer 16 of adhesive beneath the bead. It will be noted that the excessive plastic adhesive displaced by the bead provides a marginal flange 17 around the bead which, when the plastic adhesive sets, securely embraces the lower marginal edge portion 18 of the bead to further insure its retension on the fabric. After the adhesive has thoroughly dried and set the exposed marginal portions thereof, including the flange 17, may be tinted or otherwise painted, unless such coloring is mixed with the adhesive prior to use.

The particular result obtained, as outlined in the foregoing, is arrived at only by the use of the improved non-vitreous plastic adhesive. Other known adhesives lack either sufficient body to be pliable and formed before setting, or lack flexibility when set. A vitreous adhesive will not retain the beads permanently because it tends to crack up and fall away following successive handling of the fabric. The adhesive employed preferably consists of proportional quantities of whiting, fuller's earth, glue and linseed oil. The particular proportion of each as found most suitable to produce the desired adhesive is substantially as follows: whiting 55%, fuller's earth 18%, glue 18% and linseed oil 9%. Such an adhesive is easily worked, sets quickly, and retains sufficient moisture to prevent cracking when set.

Although the proportions of the ingredients have been set out in the foregoing, and only one mode of application of beads has been illustrated and described, it is to be understood that the beads, individually set, may be of any size, and that other variations may occur without departing from the spirit of the invention and the scope of the appended claims.

I claim:

1. A beaded fabric comprising a flexible foundation sheet, a plurality of glass beads thereon, said beads being substantially flat on one face and convex on the other, and a plastic adhesive securing said beads flat face down to said sheet, said adhesive extending beyond the outline of each of said beads and embracing the lower marginal edge thereof.

2. A jeweled fabric comprising a flexible foundation sheet, a plurality of jewels thereon, said jewels being substantially flat on one face and having an upwardly inclined marginal edge, and a plastic adhesive extending beyond the marginal edge of each of said jewels, said adhesive embracing the inclined marginal edge thereof.

BERTHA M. DYCKMA.